Dec. 6, 1932.     C. M. CHAPMAN     1,889,745
STRUCTURAL UNIT AND PROCESS FOR MAKING SAME
Filed Jan. 14, 1928
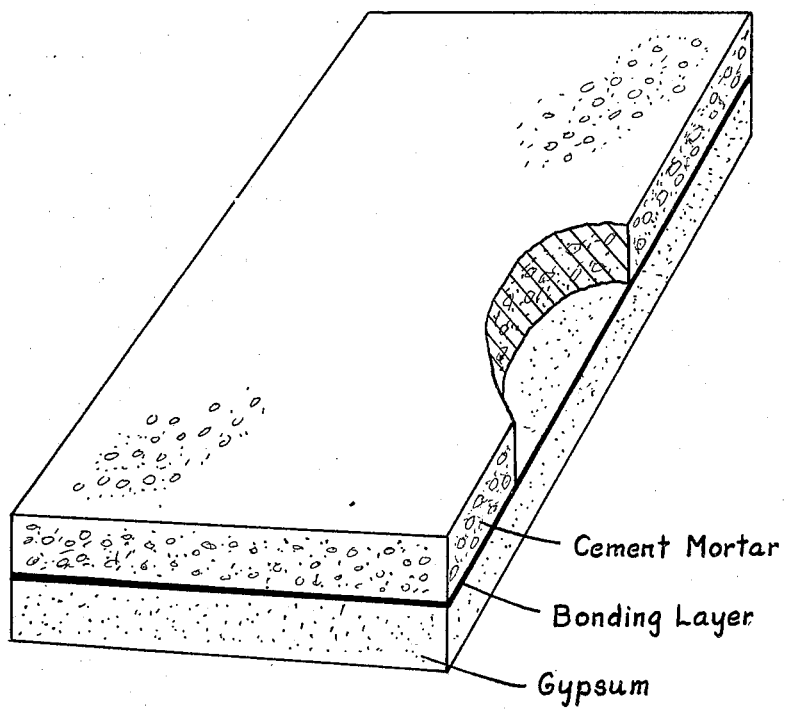
Cement Mortar
Bonding Layer
Gypsum
Cloyd M. Chapman
INVENTOR.

Patented Dec. 6, 1932

1,889,745

UNITED STATES PATENT OFFICE

CLOYD M. CHAPMAN, OF DOUGLASTON, NEW YORK

STRUCTURAL UNIT AND PROCESS FOR MAKING SAME

Application filed January 14, 1928. Serial No. 246,906.

My invention relates to structural units of the "precast" type in which gypsum is a principal ingredient and to portions of structures which are "cast-in-place" of material in which gypsum is a principal ingredient and to processes for making both the precast units and the poured-in-place portions of structures. The object of my invention is to provide a structural unit or a portion of a structure composed of gypsum having a surface or surfaces to which coats of plastic material containing cement will, when applied, firmly and tenaciously adhere, and secondly, to provide a process by which such a unit or portion of structure may be produced inexpensively, simply and quickly.

The figure of the drawing illustrates an embodiment of a unit according to my invention.

It is generally known that gypsum blocks such as are in common use for the construction of interior walls and partitions may not be used for exterior walls which will be exposed to the weather, for the reason that gypsum will rapidly absorb moisture during rains and when wet loses much of its strength. Cement mortar will not adhere to or bond with gypsum or plaster of Paris and therefore it has been found impractical to protect gypsum structures by means of a cement mortar coat or stucco. Whenever this has been attempted the cement mortar coat has soon become loose and scaled off leaving the gypsum surface unprotected.

The same difficulty is experienced in the case of floors, ceilings and roofs constructed either of precast gypsum units or of gypsum slabs formed in place in the structure by pouring freshly mixed cementitious materials containing gypsum and water into a form. The difficulty arises from the failure of Portland cement mortar coats to bond with or firmly adhere to the gypsum base. It has therefore been impracticable to finish floors, ceilings or roofs having a base of gypsum with a coat of mortar applied direct to the gypsum, as it is often very desirable to do.

I have found that by a treatment of the surface of material containing gypsum to which it is desired to apply a mortar coat of cement or of cement and aggregate, it is possible to secure such a tenacious bond between the gypsum and the mortar that no separation takes place. In fact, by the use of my invention, the plane of contact between the two materials becomes the strongest portion of the composite structure.

I find that by treating the surface of the material containing gypsum at the time that this material is taking its "set" during its fabrication with a material which will bond with or adhere to the gypsum and to which in turn a mortar containing cement will when applied firmly adhere, that I can produce a surface which fulfills all the requirements which the untreated gypsum surface lacks in the matter of providing a firm bond with cement.

I find that a number of materials will serve this purpose. For example, I find that while cement will not bond with gypsum it will firmly bond with a mixture of cement and gypsum.

I find that by sprinkling or sifting or otherwise applying a layer of cement to the surface of gypsum while the gypsum is still in a plastic state before it has set, and by mixing, by means of a stiff brush or broom or a comb-like tool or otherwise, the cement into the surface of the soft gypsum, and then allowing the gypsum and cement to set and harden, I have produced a surface to which cement or cement mortar may be applied and to which it will adhere so strongly that when the composite mass is broken it will not separate at the surface of contact or union between the gypsum and the cement or mortar containing cement.

I also find that a similarly effective result may be obtained by incorporating in the surface of the gypsum before it has set and while still in a plastic state, a granular or powdered material which will bond with or firmly adhere to the gypsum and to which cement or mixtures containing cement will bond or firmly adhere. I find that ground or granulated stone of various varieties are suitable for this purpose. An example of a suitable stone is an argillaceous limestone, sometimes called "cement rock," and from which natural or Portland cement is largely made. Crushed slag, trap rock and other hard, durable mineral, inorganic materials are suitable for my purpose. I crush or grind the material to a size which will pass a sieve having 20 meshes per lineal inch before using. When using granular as distinguished from powdered materials to produce a surface on gypsum to which cement will bond, I use both a mixing and pressing operation to incorporate the particles into the surface of the gypsum or material containing gypsum. The resulting surface is smooth and free from roughness or projecting particles but it may be ribbed or corrugated, or undulating or patterned to produce a pleasing appearance when desired, although such variations in the surface are not essential to the production of a proper bond between the unit and an applied coating containing cement.

Obviously my invention may be applied to the surface of gypsum or plaster of Paris which has been cast in place in a structure as well as to precast structural units of this material. It may also be applied to materials composed partially but not entirely of gypsum or plaster of Paris. I do not intend to limit its application to any particular kind of structure or structural unit or to any particular composition of material.

I am aware that structural units have been produced with a roughened surface or with dovetail grooves for the purpose of providing a "key" to hold a mortar in place but such units depend for their bond upon purely mechanical interlocking of the material of the unit with the material of the mortar without providing any firm adhesion of the one material to the other.

When such combinations of gypsum materials and cement materials are broken they separate with a distinct cleavage between the two materials. When my new process is employed the granular or powdered materials bond so firmly with the gypsum materials on the one hand and with the cement material on the other, that when an attempt is made to separate the materials by force or by shock the gypsum material will break, if that be the weaker of the two, or the cement material will break if that be the weaker of the two, but the fracture will not occur at the surface of contact or union of the two materials.

In my co-pending application, S. N. 242,301 I have described a structural unit and a process which provide a chemical bond between the gypsum and cement. This chemical bond is secured by treating the surface of the gypsum material with a solution which so alters the chemical structure of the gypsum that a firm bond is secured to cement. No solid or granular or powdered materials are used and none are required but in this invention I accomplish a similar result, i. e., a firm bond between a gypsum material and a cement material, without the application of any chemical solution or water soluble material.

I claim:

1. A portion of a structure comprising a gypsum member having a smooth surface which has incorporated therein a multiplicity of small particles of a mineral matter and a layer of cement mortar bonded thereto.

2. A portion of a structure comprising a gypsum member having a smooth surface which has incorporated therein a multiplicity of small particles of Portland cement and a layer of cement mortar bonded thereto.

3. The process of forming a structure or structural unit, which consists in moulding said structure or structural unit of gypsum, incorporating in the surface thereof while still in a plastic state a multiplicity of small particles of a mineral matter which is capable of bonding with cement and smoothing said surface after incorporating said particles.

Signed at New York city, in the county of New York and State of New York, this 13th day of January, A. D. 1928.

CLOYD M. CHAPMAN.